United States Patent
Marumoto et al.

(10) Patent No.: US 7,628,015 B2
(45) Date of Patent: Dec. 8, 2009

(54) CONTROL FOR ELECTRICALLY DRIVEN SUPERCHARGER

(75) Inventors: Masaharu Marumoto, Hiroshima (JP); Yoshihisa Nakamoto, Hiroshima (JP); Naoyuki Yamagata, Higashihiroshima (JP); Mikihito Fujii, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 228 days.

(21) Appl. No.: 11/470,843

(22) Filed: Sep. 7, 2006

(65) Prior Publication Data

US 2007/0051349 A1    Mar. 8, 2007

(30) Foreign Application Priority Data

Sep. 8, 2005   (JP) .............................. 2005-260330

(51) Int. Cl.
F02B 33/44   (2006.01)
(52) U.S. Cl. .......................................... 60/607; 60/608
(58) Field of Classification Search .................. 60/597, 60/598, 607, 608
See application file for complete search history.

(56) References Cited

U.S. PATENT DOCUMENTS

| | | | |
|---|---|---|---|
| 4,757,686 A | | 7/1988 | Kawamura et al. |
| 4,798,257 A | * | 1/1989 | Kawamura et al. .......... 180/165 |
| 4,833,887 A | * | 5/1989 | Kawamura et al. ............ 60/608 |
| 4,850,193 A | * | 7/1989 | Kawamura .................... 60/608 |
| 4,878,347 A | * | 11/1989 | Kawamura .................... 60/608 |
| 4,882,905 A | * | 11/1989 | Kawamura .................... 60/608 |
| 4,901,530 A | * | 2/1990 | Kawamura .................... 60/608 |
| 4,958,708 A | * | 9/1990 | Kawamura .................... 60/608 |
| 5,906,098 A | * | 5/1999 | Woollenweber et al. ....... 60/608 |
| 6,062,026 A | | 5/2000 | Woolenweber et al. |
| 6,205,787 B1 | | 3/2001 | Woolenweber et al. |

(Continued)

FOREIGN PATENT DOCUMENTS

JP   2004-169629 A   6/2004

(Continued)

OTHER PUBLICATIONS

European Search Report for EP Application 06018036.1 Dec. 29, 2006.

*Primary Examiner*—Thomas Denion
*Assistant Examiner*—Douglas J. Duff
(74) *Attorney, Agent, or Firm*—Alleman Hall McCoy Russell & Tuttle LLP (57) ABSTRACT

There is provided a method for controlling an electrically driven supercharger of an internal combustion engine. The method comprises operating the supercharger at a first speed during a first engine operating condition. The method further comprises operating the supercharger at a second speed during a second engine operating condition, the second speed being lower than the first speed and increasing as the capacity of the electric power source decreases.

According to the method, during a transition from the second engine operating condition to the first engine operating condition, the speed of the supercharger is increased from the second speed to the first speed. At that time, the second speed is increased as the capacity of the electric power source decreases, and as a result, the supercharger speed increase that results from the transition may become smaller. Consequently, the inrush electric current from the electric power source to the electric motor may be reduced during the transition, thereby avoiding further degradation of the electric power source.

19 Claims, 9 Drawing Sheets

U.S. PATENT DOCUMENTS

| | | | |
|---|---|---|---|
| 6,684,863 B2 * | 2/2004 | Dixon et al. | 123/565 |
| 6,718,955 B1 | 4/2004 | Knight | |
| 6,922,995 B2 * | 8/2005 | Kawamura et al. | 60/608 |
| 7,127,892 B2 * | 10/2006 | Akins et al. | 60/600 |
| 7,174,714 B2 * | 2/2007 | Algrain | 60/608 |
| 7,367,189 B2 * | 5/2008 | Ishiwatari | 60/608 |

FOREIGN PATENT DOCUMENTS

JP  2004-346910 A  12/2004

* cited by examiner

CONTROL FOR ELECTRICALLY DRIVEN SUPERCHARGER

BACKGROUND

The present description relates to control for an electrically driven supercharger of an internal combustion engine.

Conventionally, a turbocharger or a mechanical supercharger is used to increase or "boost" engine torque. A mechanical supercharger may be powered by the engine through a mechanical connection such as a belt drive mechanism coupling the engine crankshaft to the supercharger's shaft. A turbocharger is powered by engine exhaust gas energy that flows through a turbine that is arranged in the engine exhaust passage. The turbine is coupled to a compressor that pressurizes air entering the engine. Consequently, the speed of the mechanical supercharger is usually in proportion with the speed of the engine. Likewise, engine speed affects the flow through an engine and therefore influences the speed of the turbine. Supercharging efficiency of the mechanical supercharger or of the turbocharger may be affected by the engine speed. In particular, it may be deteriorated at a lower engine speed.

To address this issue, there is known and presented an electrically driven supercharger or an electric supercharger, for example, in U.S. Pat. No. 6,684,863. Since an electric motor drives the supercharger with electricity supplied from a battery, the engine speed may not affect the operation of the supercharger. When the "boost" is required, the electric supercharger is controlled to rotate at a rated operating speed, such as 60,000 rpm. When the boost is not desired, such as during a lower load condition, the intake air bypasses the supercharger through a bypass passage, thereby making it unnecessary to drive the supercharger. When boost is desired, the bypass passage is closed and the supercharger compresses the incoming air. However, at lower load conditions, the electric supercharger is not controlled to stop because stopping the supercharger would increase the time necessary for the supercharger to reach a desired speed when the engine torque demand is transitioned to a higher load condition where the boost is desired. Rather, the supercharger is controlled to rotate at an idle speed that may be up to 20,000 rpm. The supercharger idle speed is set according to various conditions that include the probability of transitioning to a higher load and the state of charge of the battery.

During a transition from a non-boost condition to a boost condition, the speed of the supercharger is increased from the idle speed to the target speed using feedback control, thereby supplying maximum electricity or inrush electric current to the electric motor from the idle speed to the target speed. At that time, the inrush of electric current may exceed electric generation capacity of electric generator or alternator, thereby consuming electric charge of the battery. In the '863 patent, the supercharger idle speed is set lower as the battery charge is lower. When the battery is degraded, for example, due to a long time use, the idle speed is set lower and the feedback control of the supercharger speed increases the inrush current. Such an increase of inrush current may cause a further degradation of the battery. This in turn, may make it more difficult to start the engine when relatively large amounts of electricity are needed, for example.

The inventors herein have recognized the problem of the above prior art and have developed a method to improve the control on the electric supercharger.

SUMMARY

Accordingly, there is provided a method for controlling an electrically driven supercharger of an internal combustion engine. The method comprises operating the supercharger at a first speed during a first engine operating condition. The method further comprises operating the supercharger at a second speed during a second engine operating condition, the second speed being lower than the first speed and increasing as the capacity of the electric power source decreases.

According to the method, during a transition from the second engine operating condition to the first engine operating condition, such as a transition from a lower demanded torque to a higher demanded torque, the speed of the supercharger is increased from the second speed to the first speed. At that time, the second speed is increased as the capacity of the electric power source decreases, and as a result, the supercharger speed increase that results from the transition may become smaller. Consequently, the inrush electric current from the electric power source to the electric motor may be reduced during the transition, thereby avoiding further degradation of the electric power source.

An electrically driven supercharger may be comprised of a compressor capable of boosting intake air to the engine and an electric motor which is supplied electricity from the electric power source to drive the compressor. The electric power source may comprise an electric generator driven by the engine, for example an alternator, which can solely supply electricity to the electric motor of the supercharger during the second operating condition at which time the demanded torque is smaller. In other words, the increased amount of electricity that is supplied to the electric motor during the second engine operating condition is limited to the electric generation capacity of the electric generator. The electric power source may further comprise a battery which can be charged by the electric generator and can supply electricity to the electric motor during the first engine operating condition. Therefore, when the battery voltage decreases or when the battery may be degraded, the electric motor can be driven solely with electricity from the electric generator during the second engine operating condition. Consequently, the supercharger can be operated at the second speed for an extended period time while conserving electric charge stored in the battery.

An engine system having the electrically driven supercharger may comprise a boost passage introducing air through the compressor of the supercharger into the engine, a bypass passage introducing air into the engine bypassing the boost passage, and a bypass control valve capable of regulating the airflow through the bypass passage. The bypass control valve may close the bypass passage during the first engine operating condition when the demanded engine torque is greater, so that all the airflow goes through the boost passage and is boosted by the compressor of the supercharger. The bypass control valve may open the bypass passage during the second engine operating condition when the demanded engine torque is smaller, so that the substantial portion of the airflow goes through the bypass passage bypassing the compressor of the supercharger. However, when the capacity of the electric power supply decreases, the bypass control valve may throttle the airflow through the bypass passage, so that the pressure drop is generated across the bypass control valve and across the compressor of the supercharger. The pressure drop may help to accelerate the supercharger.

The system may further comprise a common intake passage arranged downstream of both the boost passage and the bypass passage, and a throttle valve capable of throttling airflow through the common intake passage. The throttle valve may be fully opened when the pressure drop is generated so that the pressure drop may be greater since the intake air motion into the engine directly acts on the downstream side of the compressor.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
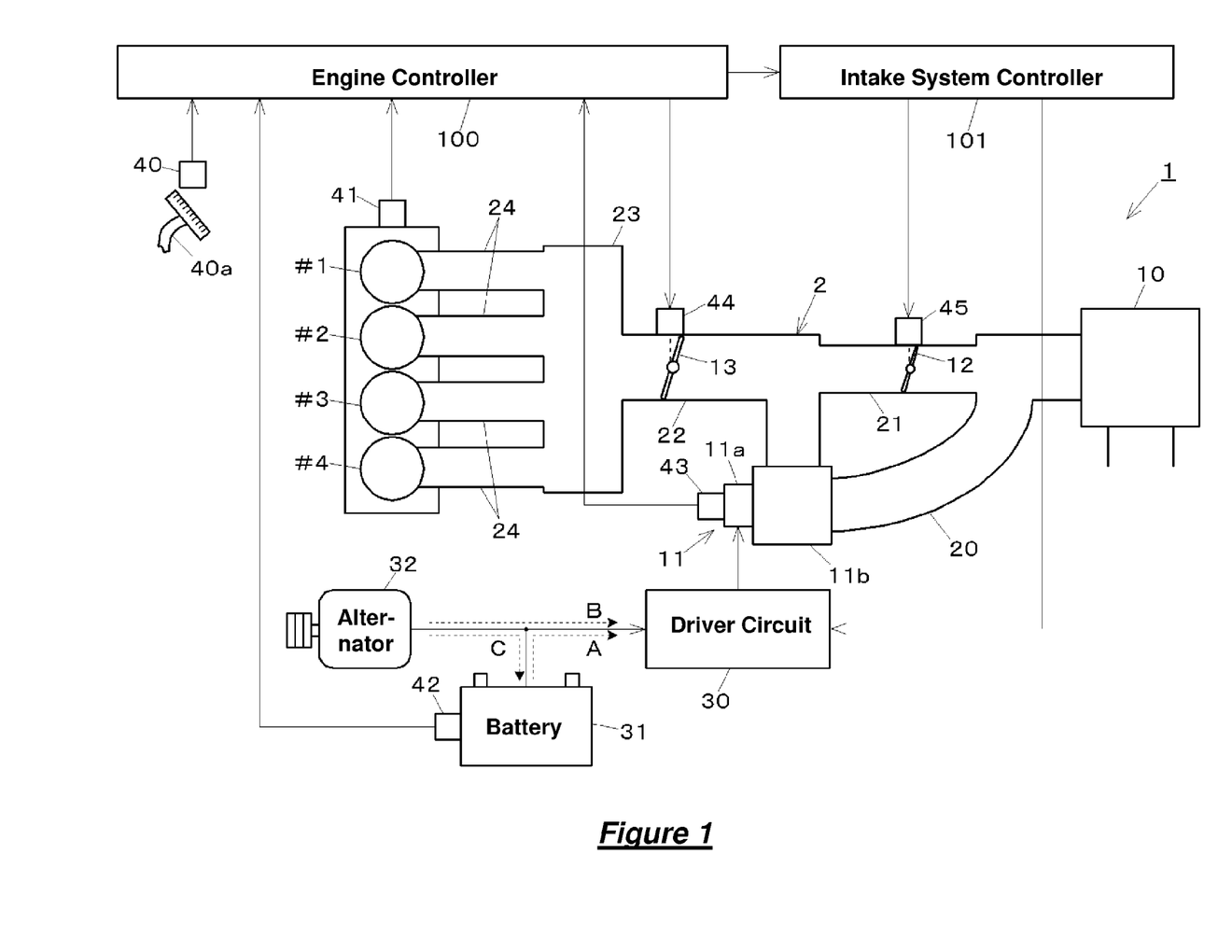
FIG. 1 is a schematic diagram of an engine system having an electrically driven supercharger according to embodiments of the present description.

The embodiments of the present description will now be described with reference to the drawings, starting with FIG. 1, which shows an overview of an air intake system 1 of an internal combustion engine 200, such as a four cylinder gasoline engine.

The air intake system 1 has an intake passage 2 through which fresh air is inducted into the engine 200. The intake passage 2 comprises an air cleaner 10, a boost passage 20, a bypass passage 21 and a common passage 22. The boost passage 20 and the bypass passage 21 branch away from each other at the downstream of the air cleaner 10 and converge again at the upstream of the common passage 22. There are arranged, downstream of the common passage 22, a surge tank 23 and individual intake passages 24, through which air flows finally into the respective cylinders #1 through #4 of the engine 200. On the boost passage 20, a supercharger 11 is arranged. On the bypass passage 21, a bypass control valve 12 is arranged and driven by an bypass valve actuator 45 to regulate air flow in the bypass passage 21, so that air bypasses the boost passage 20 when the bypass passage 21 is opened. On the common passage 22, a throttle valve 13 is arranged and driven by a throttle actuator 44 to regulate the inducted air flow into the engine 200.

The supercharger 11 comprises a compressor 11a, which pumps air inducted from the upstream to the downstream, as well known in the art. The compressor 11a may be a displacement type such as a Roots type and sliding vane type or any other type such as a centrifugal type of compressor. The supercharger 11 further comprises an electric motor 11b coupled with the compressor 11a to drive it. The electric motor 11b in this embodiment consumes 2 kW of electricity at its rated output.

A driver circuit 30 controls electric current supplied to the motor 11b of the supercharger 11. The driver circuit 30 is supplied with electricity from a battery 31 and an alternator 32. The battery 31 is a 12 volt electric power source and capable of supplying electricity to the driver circuit 30 as shown by an arrow A. The alternator 32 is driven by the engine 200 through a belt and pulleys, as well known in the art, to generate 14 volt direct electric current. The electricity generated by the alternator may be supplied directly to the driver circuit 30, as shown by an arrow B, or may be stored in the battery 31 or charge it, as shown by an arrow C.

An engine controller 100 is a microcomputer based controller having a microprocessor, a memory storing a program executed by the microprocessor and data, and an input/output interface, as is well known in the art, and controls the operation of the engine 200. The engine control unit 100 receives various signals including a signal ($P_{AP}$) from an accelerator pedal position sensor 40 detecting a position of an accelerator pedal 40a, as demanded load or power from the engine 200, a signal ($N_E$) from an engine speed sensor 41 detecting a rotational speed of the engine 200, a signal ($V_B$) from a voltage sensor 42 detecting a voltage of the battery 31 and a signal ($N_M$) from a motor speed sensor 43 detecting a rotational speed of the motor 11a of the electric supercharger 11. The signal ($V_B$) from the battery voltage sensor 42 may determine degradation of the battery 31. Alternatively, the degradation of the battery 31 may be determined by voltage drop at a cranking of the engine 200 by a starter not shown or, by detecting electric currents during charge and discharge of the battery 31 with electric current sensors arranged on the lines indicated by the arrows B and C and comparing the currents. Based on these input signals, the engine control unit 100 outputs various control signals to the throttle actuator 44, an intake system controller 101 and others.

While the intake system controller 101 illustrated in this embodiment is a microcomputer based controller separate from the engine controller 100, the two units 100 and 101 may be combined to be a single microcomputer based unit, may be installed in a single casing or on a single circuit board but still be separate computers or may be in any form pertinent and known in the art. The intake controller 101, based on the input from the engine controller 100, outputs control signals to actuators including the bypass valve actuator 45 and the supercharger driver circuit 30.

Figure 2:
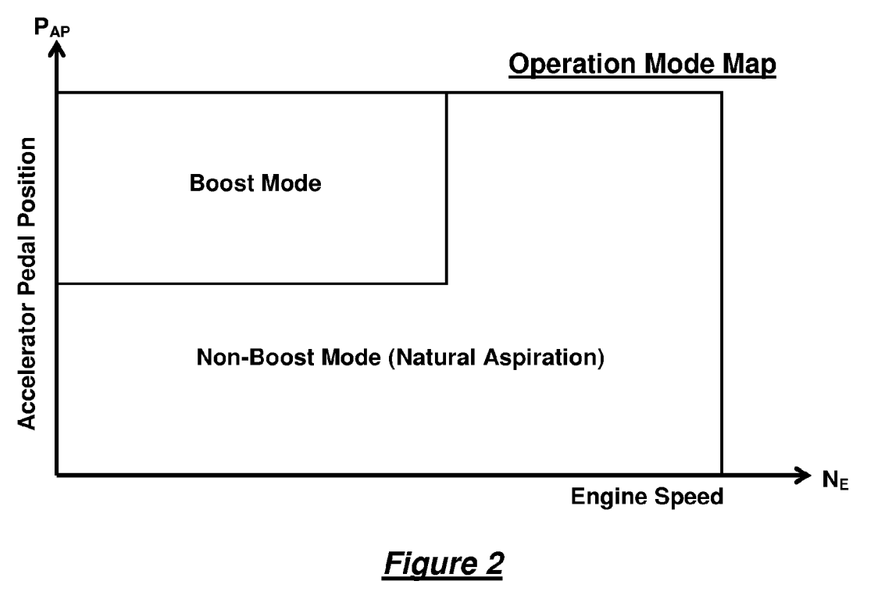
FIG. 2 is a diagram showing an operation mode map referred to by a control routine according to first and second embodiments of the present description.

The memory of the engine controller 100 stores an operation mode map, as shown in FIG. 2, determining operating mode based on the accelerator pedal position ($P_{AP}$) and the engine speed ($N_E$). A boost mode is set at the higher load and lower speed side. A non-boost mode or natural aspiration mode is set at the lower load side or the high speed side.

In the non-boost mode, the engine controller 100 controls the throttle actuator 44 to adjust the opening of the throttle valve 13, based on various operating conditions including the accelerator pedal position ($P_{AP}$) and the engine speed ($N_E$), so that the throttle valve opening is not necessarily in proportion to the APP. And the engine controller 100 sends a signal to the intake controller 101 to control the bypass actuator 45 to fully open the bypass passage 21 with the bypass control valve 12.

Also, it sends a signal to the intake controller 101 to control the driver circuit 30 to supply an electric current ($I_{MOTOR}$) to the motor 11a of the supercharger 11 to adjust an actual speed ($N_M$) of the motor 11a to be a target idle speed ($N_{TARGET}=N_{IDLE}$).

On the other hand, in the boost-mode, the engine controller 100 controls the throttle actuator 44 to adjust the opening of the throttle valve 13, as it does in the non-boost mode. The engine controller 100 sends a signal to the intake controller 101 to control the bypass actuator 45 to fully close the bypass passage 21 with the bypass control valve 12. Also the engine control unit 100 sends a signal to the intake controller 101 to control the driver circuit 30 to supply the electric current ($I_{MOTOR}$) to the motor 11a of the supercharger 11.

In either of the non-boost and boost modes, the electric current ($I_{MOTOR}$) is determined according to the equation (1) below.

$$I_{MOTOR}=I_{BASE}+(N_{TARGET}-N_{MOTOR})*G \quad (1)$$

where $I_{BASE}$: Base current
$N_{TARGET}$: Target speed of the motor 11a
$N_{MOTOR}$: Actual speed of the motor 11a
G: Gain The base current ($I_{BASE}$) is set to supply 1 kW of electricity to the motor 11a. While the target speed ($N_{TARGET}$) in the non-boost mode is determined to be the idle speed ($N_{IDLE}$) as described above, it is determined in the boost mode in accordance with the accelerator pedal position ($P_{AP}$) and the engine speed ($N_E$), preferably, read from a map of target speed ($N_{TARGET}=N_{BOOST}$) for the boost mode indexed with the parameters $P_{AP}$ and $N_E$ and stored in the memory of the engine controller 100 or the intake controller 101. The actual speed ($N_{MOTOR}$) is detected by the motor speed sensor 43 as described above. The gain (G) is a preset value.

The operation of the intake system 1 will now be described. In the non-boost mode, the throttle valve 13 is controlled by the engine controller 100 and the bypass control valve 12 is fully opened by the intake controller 101. Then, air inducted into the intake passage 2 flows through the bypass passage 21 to the common passage 22 and is inducted into the engine 200 with a flow rate depending on the opening of the throttle valve 13, so that most of the inducted air flows through the bypass passage 21. The throttle valve opening (TVO) is determined to achieve air flow for the engine 200 to generate a target torque ($T_{TARGET}$) at a given engine speed ($N_E$), preferably by referring to a map of the throttle valve opening indexed with the two parameters $T_{TARGET}$ and $N_E$ and stored in the memory of the engine controller 100. The target torque ($T_{TARGET}$) is determined based on the accelerator pedal position ($P_{AP}$) and the engine speed ($N_E$), preferably by referring to a map of the target torque indexed with two parameters $P_{AP}$ and $N_E$ and stored in the memory of the engine controller 100.

In the non-boost mode, the small amount of idle current ($I_{MOTOR}=I_{IDLE}$) is supplied to the motor 11a of the supercharger 11 to maintain the idle speed ($N_{IDLE}$), which is determined as described later in greater detail. By always spinning the motor 11a at the idle speed, the driver circuit 30 may recognize the angular phase of the motor 11a all the time, if the motor 11a is a three phase induction motor or any other pertinent motor, a response of the supercharger can be enhanced during a transition from the non-boost mode to the boost mode, thereby achieving a quicker increase of boost pressure. Consequently, as shown in a graph of FIG. 3, higher torque is generated only at a higher engine speed by natural aspiration in the non-boost mode.

Figure 3:
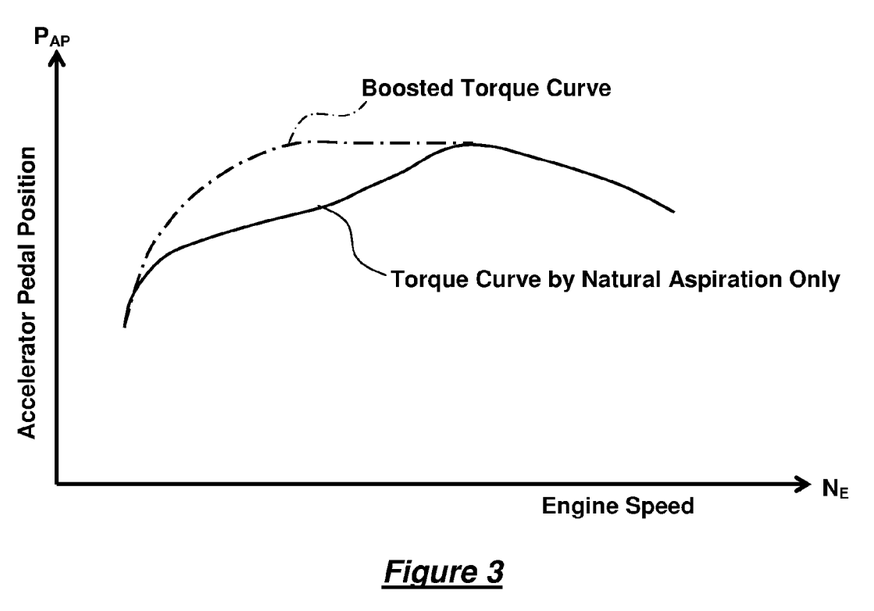
FIG. 3 is a graph showing maximum torque curves respectively by a supercharged engine and a naturally aspirated engine.

On the other hand, in the boost mode, the throttle valve 13 is controlled by the engine controller 100 and the bypass control valve 12 is fully closed by the intake controller 101. Then, the air inducted into the intake passage 2 can not pass through the bypass passage 21 due to the closed bypass control valve 12 and can only flow through the boost passage 20. A boost current ($I_{TARGET}=I_{BOOST}$) expressed by the equation (1) is supplied to the motor 11a, thereby feedback controlling the speed of the motor 11a to be the target speed ($N_{TARGET}=N_{BOOST}$) described above. Consequently, the air inducted into the boost passage 20 is pumped downstream of the supercharger 11 and introduced into the common passage 22, thereby being inducted into the engine 200 in accordance with the opening of the throttle valve 13. As a result, in the boost mode, as shown in the graph of FIG. 3, mainly at the lower engine speed, more torque can be generated than that generated only by the natural aspiration.

Now, a control routine for the intake system 1, which is stored in the memory of and executed by the microprocessor of the engine controller 100 and/or the intake controller 101, will be described with reference to a flowchart of FIG. 4.

Firstly at a step S1, the routine reads various signals including the position $P_{AP}$ of the accelerator pedal 40a detected by the accelerator position sensor 40, the engine speed $N_E$ detected by the engine speed sensor 41, the battery voltage $V_B$ detected by the battery voltage sensor 42 and the motor speed $N_E$ detected by the motor speed sensor 43. The routine proceeds to a step S2, where it is determined whether the operating mode is the boost mode based on the accelerator pedal position $P_{AP}$ and the engine speed $N_E$, preferably by referencing the operation mode map as illustrated in FIG. 2.

If the operating mode is determined to be the boost mode (YES) at the step S2, the routine proceeds to a step S3 where the bypass control valve 12 is closed. Then, it proceeds to a step S4 where the target speed $N_{TARGET}$ of the motor 11a of the supercharger 11 is determined based on the accelerator position $P_{AP}$ and the engine speed $N_E$ as described above. Next at a step S5, the motor current $I_{MOTOR}$ supplied to the motor 11a is determined in accordance with the equation (1) described above based on the target speed $N_{TARGET}$ determined at the step S4. Finally, the motor current $I_{MOTOR}$ determined at the step S5 is supplied to the motor 11a of the supercharger 11 at a step S6, then the routine returns.

If the operating mode is determined to be the non-boost mode (NO) at the step S2, the routine proceeds to a step S7 where the bypass control valve 12 is opened. Then it proceeds to a step S4 where it is determined whether the battery voltage $V_B$ is less than a predetermined value $V_{B1}$ or not. If it is less than the predetermined value, the battery 31 may be determined to be degraded.

If the battery voltage $V_B$ is not determined to be less than the predetermined value $V_{B1}$ (NO) at the step S4, the routine proceeds to a step S9 where the target speed $N_{TARGET}$ of the motor 11a of the supercharger 11 is determined to be an normal idle speed $N_{IDLE\_N}$, for example 5000 rpm. In another example, the normal idle speed $N_{IDLE\_N}$ may be 0 rpm, in other words, the supercharger 11 may be stopped in the non-boost mode if the battery is determined not to be degraded. Then, it proceeds to the step S5, where the electric current to the supercharger motor 11a ($I_{MOTOR}$) is determined based on the target speed $N_{TARGET}=N_{IDLE\_N}$ in accordance with the equation (1), then to the step S6 where the electric current $I_{MOTOR}$ determined in accordance with the equation (1) is supplied to the motor 11a, in the same manner as in the boost mode described above.

On the other hand, if the battery voltage $V_B$ is determined to be less than the predetermined value $V_{B1}$ (YES) at the step S4, the battery 31 may be supposed to be degraded. Then, the routine proceeds to a step S10, where the target speed $N_{TARGET}$ of the motor 11a is determined to be a higher target idle speed for battery degradation ($N_{IDLE\_H}$). Next, the routine proceeds to the steps S5 and S6 where the electric current $I_{MOTOR}$ is determined and supplied to the supercharger motor 11a, as described above.

Figure 5:
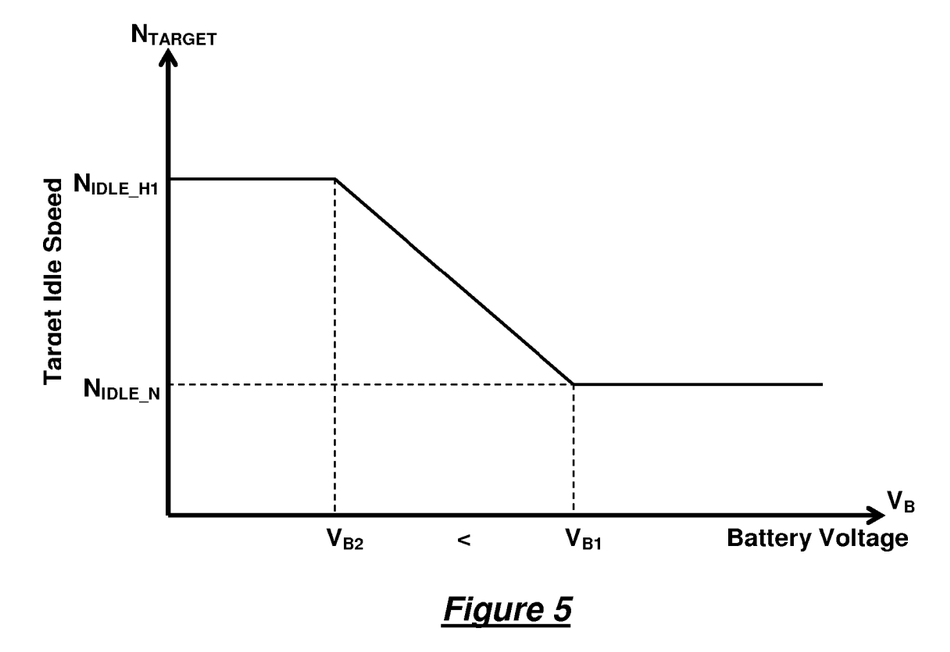
FIG. 5 is a graph of a target idle speed versus a battery voltage according to the first embodiment.

When the battery voltage $V_B$ is lower than the predetermined value $V_{B1}$, the higher target idle speed $N_{IDLE\_H}$ is determined to increase as the battery voltage $V_B$ is lower, in other words, the battery 31 is more degraded, until it reaches a predetermined speed $N_{IDLE\_H1}$ (for example 15,000 rpm) at a battery voltage $V_{B2}$, as shown in a graph of FIG. 5. Beyond the $V_{B2}$, the higher target speed $N_{IDLE\_H}$ is constant to be the $N_{IDLE\_H1}$. Depending on a particular configuration of vehicle electricity generation system including the alternator 32, the predetermined speed $N_{IDLE\_H1}$ is set to be corresponding to a maximum electric current which the alternator 32 can generate when it rotates at its minimum speed, in other words, an idle speed of the engine 200. Therefore, no matter whatever higher target idle speed $N_{IDLE\_H}$ is determined, no electricity will be discharged from the battery 31 which is already degraded.

Figure 6:
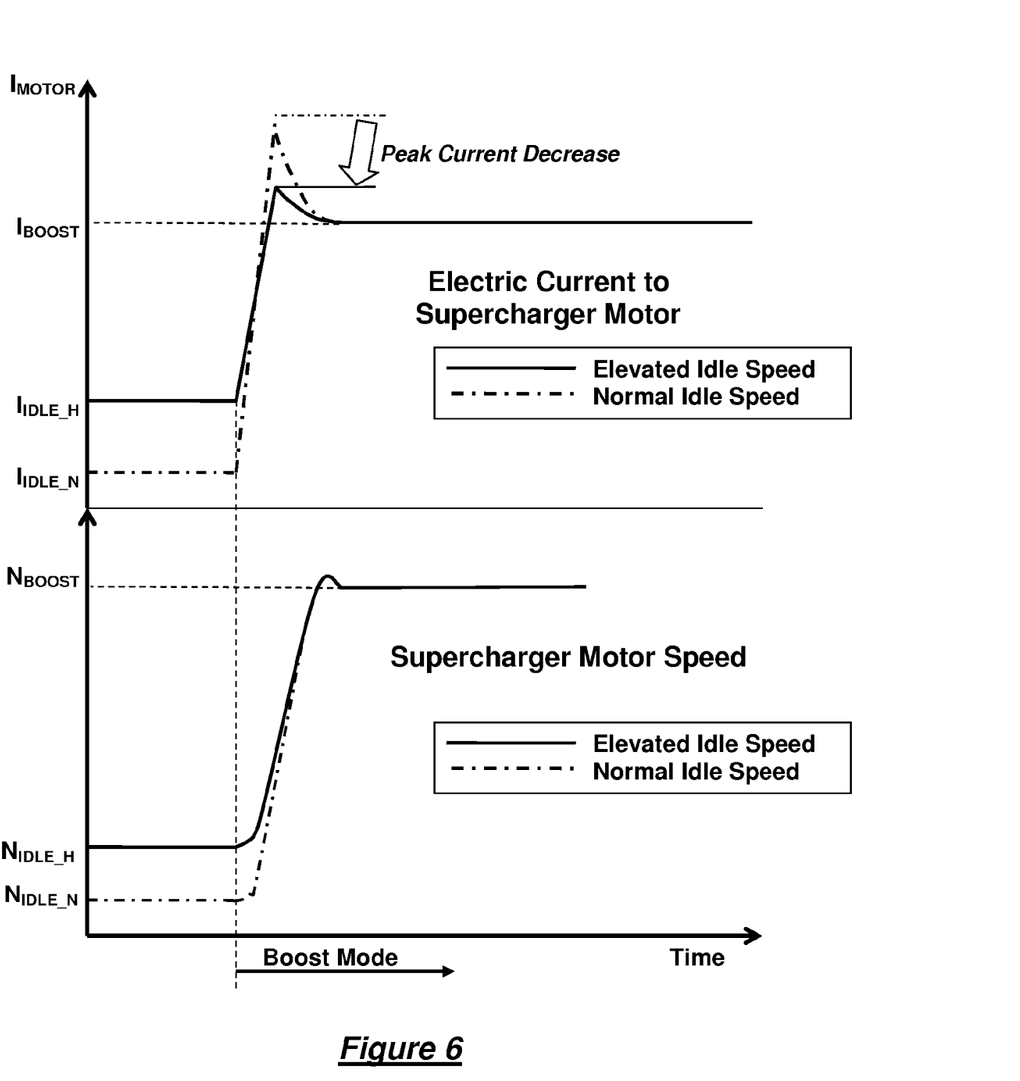
FIG. 6 is a time chart showing changes of a supercharger motor speed and an electric current to the supercharger motor over a transition from the non-boost mode to the boost mode according to the first embodiment.

As shown in a lower diagram of FIG. 6, when the battery voltage the battery 31 may be degraded, the idle speed of the motor 11a is raised to the higher idle speed $N_{IDLE\_H}$ (for example, 15,000 rpm) from the normal idle speed $N_{IDLE\_N}$ (for example, 5000 rpm). As a result, a difference between the idle speed $N_{IDLE}$ and the target speed $N_{BOOST}$ for the boost mode (for example, 60,000 rpm) will be substantially decreased.

As shown in an upper diagram of FIG. 6, the electric current $I_{MOTOR}$ supplied to the motor 11 during a non-boost mode is regulated to be the idle current $I_{IDLE}$ to feedback control the motor speed $N_{MOTOR}$ to be the $N_{IDLE}$. The electric current during the boost mode is regulated to be the boost current $I_{BOOST}$ to feedback control the motor speed $N_{MOTOR}$ to be the $N_{BOOST}$. During a transition from the non-boost to boost modes, the electric current $I_{MOTOR}$ is increased to raise the motor speed $N_{MOTOR}$ from the $N_{IDLE}$ to the $N_{BOOST}$, in accordance known feed back control methodology such as proportional control expressed in the equation (1) and proportional and integral (PI) control. Then, at least a proportional term of the feedback control of the electric current $I_{MOTOR}$ is in proportion to the difference between the target speed $N_{TARGET}$ and the actual speed $N_{MOTOR}$ of the motor 11a for a responsive control of the boost pressure, as described above with reference to the equation (1). Therefore, a larger peak inrush current will be supplied from the electric power supply to the motor 11a during the transition, as the speed difference between the $N_{IDLE}$ and the $N_{BOOST}$ is greater. The peak inrush current exceeds the electricity generation capacity of the alternator 32 so that the substantial portion of that is supplied from the battery 31. When the battery 31 is degraded, the excessive inrush current may further degrade it and accelerate the battery aging or degradation.

Figure 4:
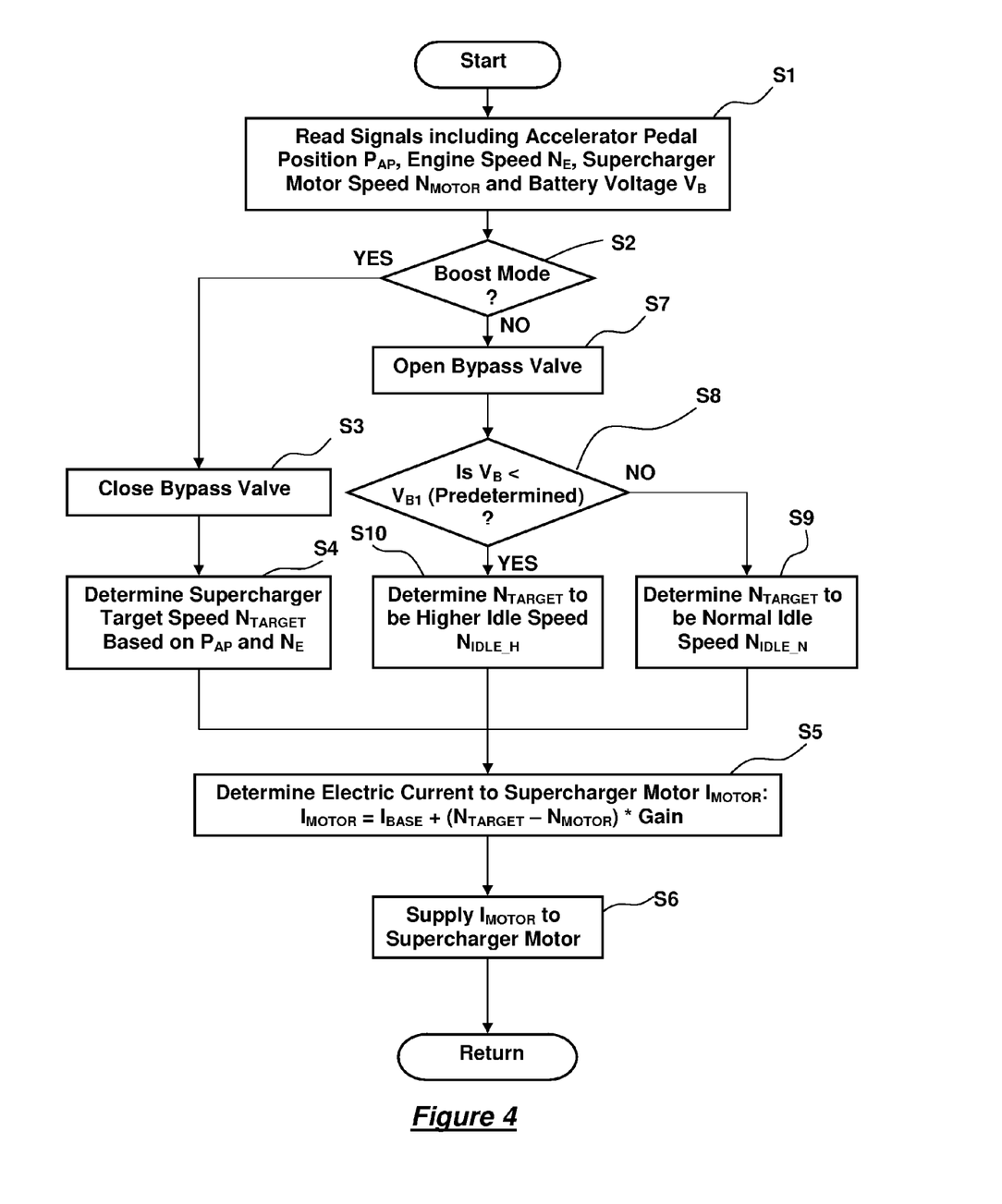
FIG. 4 is a flowchart showing the control routine according to the first embodiment of the present description.

However, according to the method of this embodiment, as illustrated in FIG. 6, when the battery 31 may be degraded, the speed difference between the $N_{IDLE}$ and the $N_{BOOST}$ is decreased by raising the target idle speed $N_{IDLE}$ from the normal idle speed $N_{IDLE\_N}$ to the higher idle speed $N_{IDLE\_H}$ which the control routine determines at the step S33 in FIG. 4. Consequently, the inrush current from the battery 31 may be decreased, thereby preventing further degradation of the battery 31.

Now, a second embodiment of the present description will be described with reference to FIGS. 7 and 8. The second embodiment is different from the first embodiment mainly with respect to control performed during the degradation of the battery 31.

Figure 7:
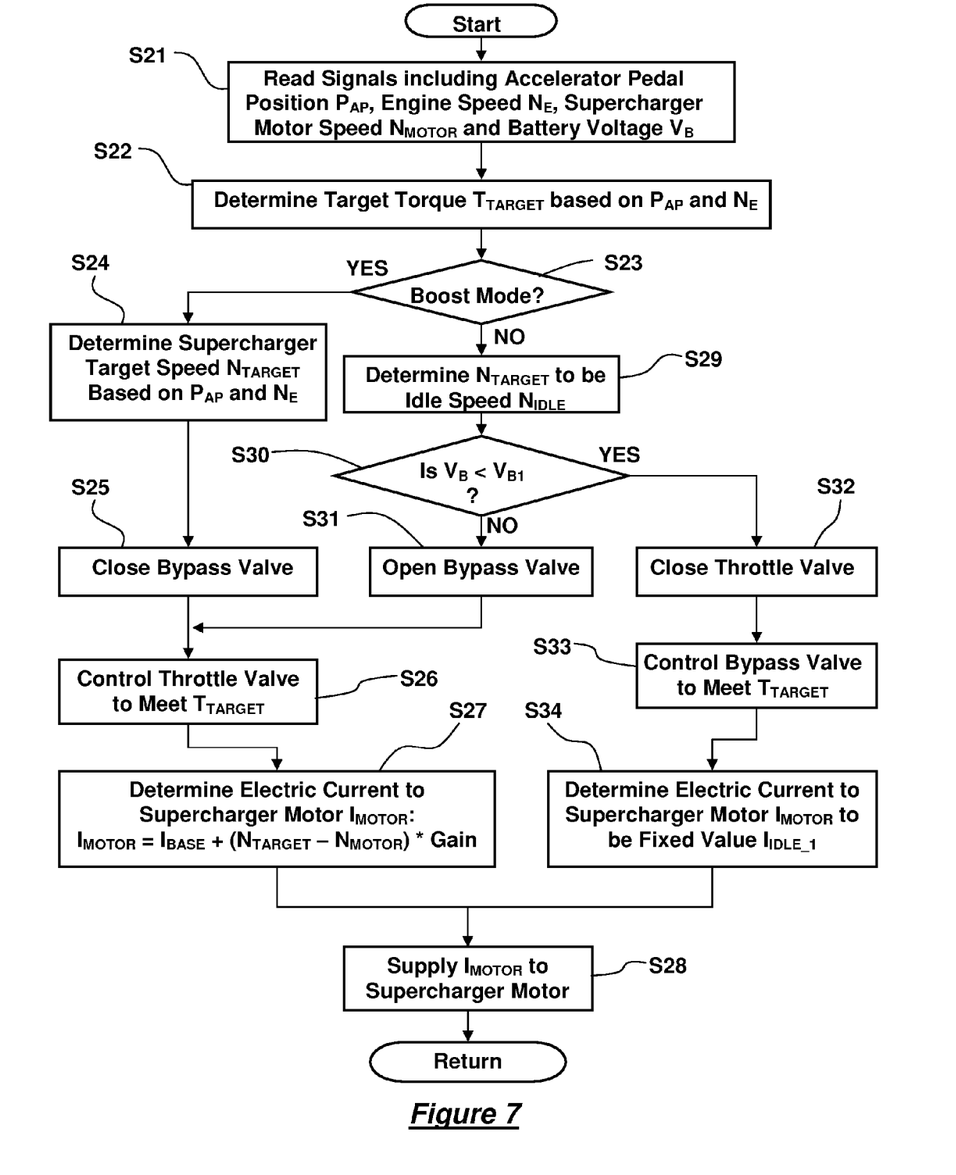
FIG. 7 is a flowchart showing the control routine according to the second embodiment of the present description.

The control routine executed by the engine controller 100 and/or the intake controller 101 in accordance with the second embodiment is illustrated in a flowchart of FIG. 7. Firstly, at step S21, the routine reads various signals in the same way as it does at the step S1 of the first embodiment in FIG. 4. Next at a step S22, the target torque $T_{TARGET}$ is determined based on the accelerator pedal position $P_{AP}$ and the engine speed $N_E$, as described above. Then, the routine proceeds to a step S23, where it is determined whether the operating mode is the boost mode based on the accelerator pedal position $P_{AP}$ and the engine speed $N_E$, preferably by referring to the operation mode map of FIG. 2.

If the operating mode is determined to be the boost mode (YES) at the step S23, the routine proceeds to a step S23, where the target speed $N_{TARGET}$ of the motor 11a of the supercharger 11 is determined based on the accelerator position $P_{AP}$ and the engine speed $N_E$ as described above. Then, it proceeds to a step S25, where the bypass control valve 12 is closed. Next at a step S26, an opening TVO of the throttle valve 13 is determined, given that the supercharger 11 pumps air at the target speed $N_{TARGET}$ determined at the step S24 and that the bypass control valve is closed at the step S25, so that the target torque $T_{TARGET}$ determined at the step S22 is generated, and the throttle valve actuator 44 is controlled to meet the determined throttle opening TVO.

After the step S26, the routine proceeds to a step S27, where the electric current $I_{MOTOR}$ to the supercharger motor 11a is determined in the same manner as at the step S5 of the first embodiment. Finally, the motor current $I_{MOTOR}$ determined at the step S27 is supplied to the supercharger motor 11a at a step S28, then the routine returns.

If the operating mode is determined to be the non-boost mode (NO) at the step S23, the routine proceeds to a step S29 where the target speed $N_{TARGET}$ of the motor 11a of the supercharger 11 is determined to be an idle speed $N_{IDLE}$, for example 5000 rpm, which is in this embodiment a fixed value. Then, it proceeds to a step S30, where it is determined whether the battery voltage $V_B$ is less than a predetermined value $V_{B1}$ or not. If it is less than the predetermined value, the battery 31 may be determined to be degraded.

If the battery voltage $V_B$ is not determined to be less than the predetermined value $V_{B1}$ (NO) at the step S30, the step proceeds to a step S31, where the bypass valve 12 is opened for the normal non-boost mode, since the battery 31 is not degraded. Then, the steps S26, S27 and S28 are executed in the same manner as in the boost mode to generate the target torque $T_{TARGET}$ from the engine 200. The routine returns.

On the other hand, if the battery voltage $V_B$ is determined to be less than the predetermined value $V_{B1}$ (YES) at the step S30, the battery 31 may be supposed to be degraded, and the routine proceeds to a step S32 where the throttle valve 13 is fully opened. Next at a step S33, an opening of the bypass control valve 12 is determined, given that the supercharger 11 idles and some air flows through the compressor 11b as described in more detail below and that the throttle valve is fully opened at the step S32, so that the target torque $T_{TARGET}$ determined at the step S22 is generated, and the bypass valve actuator 45 is controlled to meet the determined valve opening. Then, the routine proceeds to a step S34 where the motor current $I_{MOTOR}$ is determined to be a fixed value $I_{IDLE}$ 1 corresponding to the idle speed $N_{IDLE}$. The motor current $I_{MOTOR}$ is supplied to the supercharger motor 11a at the step S28 and the routine returns.

According to the second embodiment, at the steps S32 and S33 in the non-boost mode when the battery 31 may be degraded, the throttle valve 13 is fully opened and the bypass control valve 12 is at least partly closed for control the engine torque to be the target torque $T_{TARGET}$, thereby creating a vacuum pressure in the intake air passage 2 downstream of the bypass control valve 12 with a pump function of the engine 200. So, there will be a pressure difference in the boost passage 20 between the upstream and downstream of the compressor 11b, causing some airflow across the compressor 11b.

Figure 8:
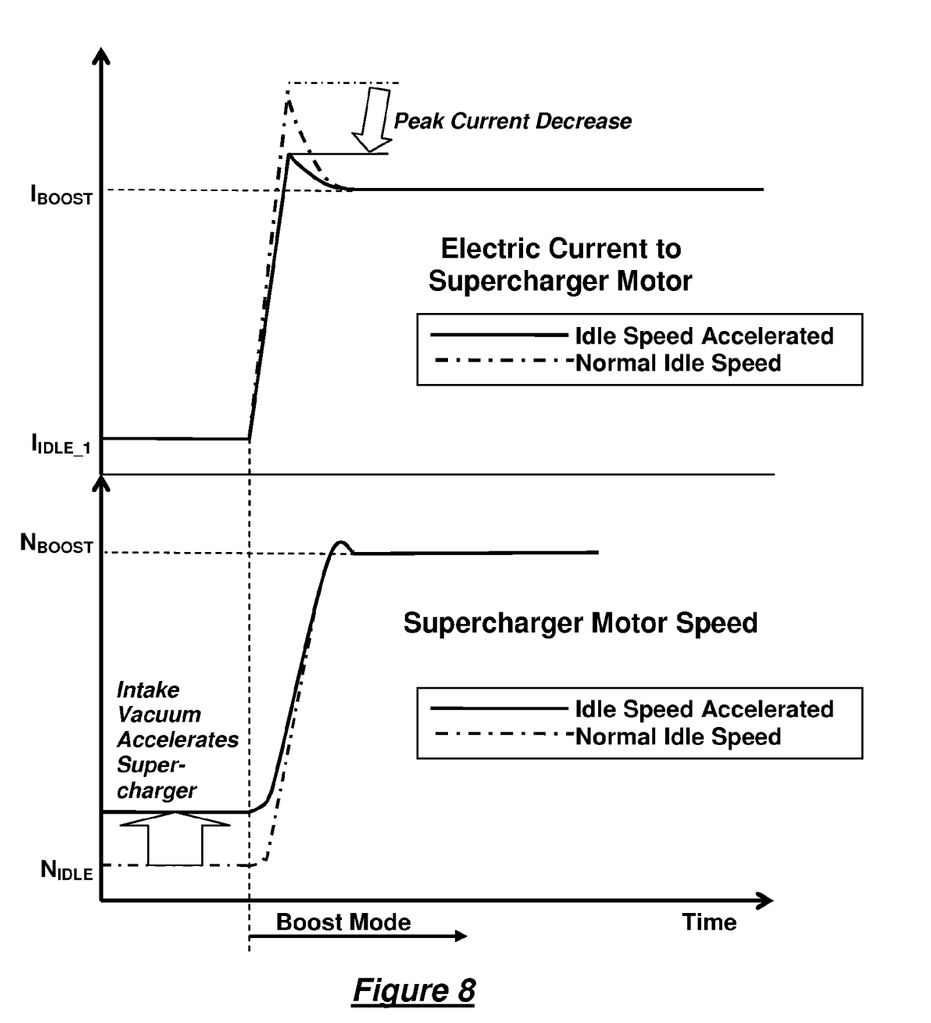
FIG. 8 is a time showing changes of a supercharger motor speed and an electric current to the supercharger motor over a transition from the non-boost mode to the boost mode according to the second embodiment.

The airflow through the compressor 11b may accelerate the rotation of the supercharger 11 from the normal idle speed $N_{IDLE}$ (e.g. 5000 rpm) to a higher speed (e.g. 15,000 rpm), as shown in a lower diagram of FIG. 8. Consequently, the speed difference between the idle speed $N_{IDLE}$ and the boost speed $N_{BOOST}$ of the supercharger 11 is decreased, thereby decreasing the peak inrush current from the battery 31 during a transition from the non-boost to boost modes, as in the first embodiment, while the idle current $I_{IDLE}$ is maintained to be normal so that the electric consumption is kept low in the non-boost mode.

Now, a third embodiment of the present description will be described with reference to FIGS. 9 and 10. In this embodiment, instead of the operation mode map shown in FIG. 2, another operation mode map shown in FIG. 9 is employed.

Figure 9:
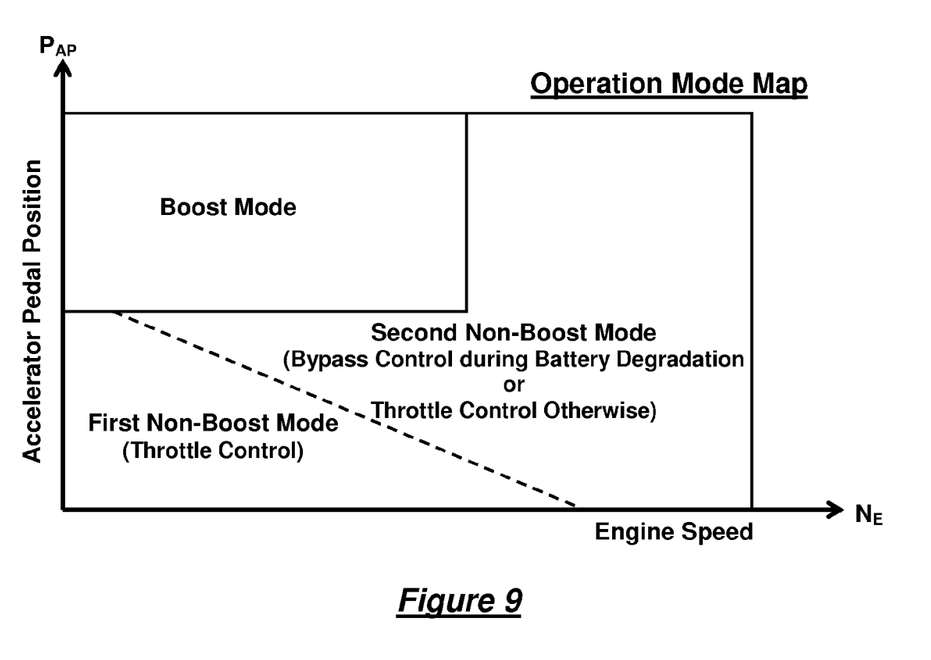
FIG. 9 is a diagram showing an operation mode map referred to by a control routine according to a third embodiment of the present description.

As shown in FIG. 9, there are the boost mode and the non-boost mode as in the map of FIG. 2. But, the non-boost mode is divided into a first non-boost mode and a second non-boost mode. The first non-boost mode is taken during the lower load and lower speed condition, while the second non-boost mode is taken otherwise. When it is considered that the battery may not be degraded, preferably by comparing the battery voltage $V_B$ to the predetermined value $V_{B1}$ as described with reference to the steps S8 and S30 of the control routines shown in FIGS. 4 and 7, same control method on the intake system 1 will be taken in both of the first and second non-boost modes. However, when it is considered the battery may be degraded, different control methods will be taken in each of the first and second non-boost modes, as described in greater detail below.

Figure 10:
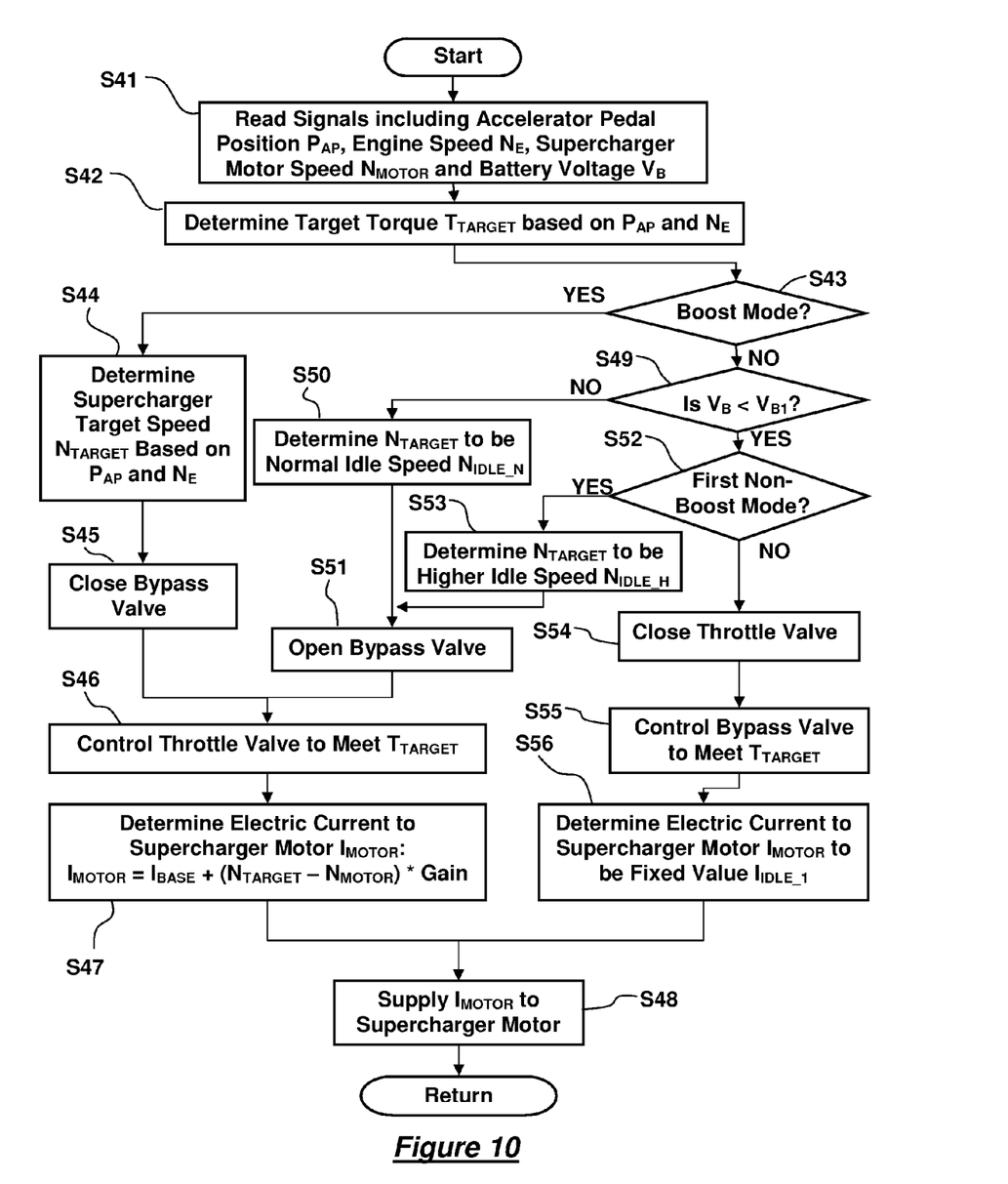
FIG. 10 is a flowchart showing a control routine according to the third embodiment of the present description.

The control routine executed by the engine controller 100 and/or the intake controller 101 in accordance with the second embodiment is illustrated in a flowchart of FIG. 10. Steps S41 through S48 are same as the steps S21 through S28 in the second embodiment shown in FIG. 7, so description for those steps are omitted here.

If the operating mode is determined not to be the boost mode (NO) at the step S43, in other words, it is either of the first and second non-boost modes, the routine proceeds to a step S49, where it is determined whether the battery voltage $V_B$ is less than a predetermined value $V_{B1}$ or not, to determine a provability of degradation of the battery 31, as described in the above embodiments.

If the battery voltage $V_B$ is not determined to be less than the predetermined value $V_{B1}$ (NO) at the step S49, the normal idle control of the supercharger 11 is performed. In other words, the target idle speed $N_{TARGET}$ is determined to be the normal idle speed $N_{IDLE\_N}$ (e.g. 5000 rpm) at a step S50 and the bypass valve control valve 12 is opened at a step S51. After that, the routine proceeds to the steps S47 and S48 and execute the control steps as in the second embodiment, then it returns.

On the other hand, if the battery voltage $V_B$ is determined to be less than the predetermined value $V_{B1}$ (YES) at the step S49, the battery 31 may be supposed to be degraded, and the routine proceeds to a step S52 to determine if the operating mode is the first non-boost mode or not based on the accelerator pedal position $P_{AP}$ and the engine speed $N_E$ by referring to the map shown in FIG. 9.

If the operating mode is determined to be the first non-boost mode (YES) at the step S52, the routine performs the same control with the degraded battery as in the first embodiment shown in FIG. 4. In other words, the target idle speed $N_{TARGET}$ is determined to be the higher idle speed $N_{IDLE\_N}$ (e.g. 5000 rpm) at a step S53 and the bypass valve control valve 12 is opened at the step S51. After that, the routine proceeds to the steps S47 and after and performs the control steps as described above.

On the other hand, if the operating mode is determined to be the second non-boost mode (NO) at the step S52, the routine performs the same control with the degraded battery as in the second embodiment shown in FIG. 7. Particularly, the throttle valve 13 is fully opened at a step S54. Next at a step S55, the bypass control valve 12 is controlled so that the engine 200 generates the target torque $T_{TARGET}$ determined at the step S42. Then, at a step S55, the motor current $I_{MOTOR}$ is determined to be the fixed value $I_{IDLE}$ corresponding to the normal idle speed $N_{IDLE\_N}$. The motor current $I_{MOTOR}$ is supplied to the supercharger motor 11a at the step S48 and the routine returns.

According to the third embodiment, when the battery 31 may be degraded by determining it at the step S49, idle speed of the supercharger 11 is raised from the normal idle speed (e.g. 5000 rpm) to the higher idle speed (e.g. 15,000 rpm), in the first non-boost mode by determining the target idle speed $I_{TARGET}$ to be the higher idle speed $N_{IDLE\_H}$ at the step S53 like the first embodiment, or in the second non-boost mode by accelerating the supercharger 11 from the normal idle speed $N_{IDLE\_N}$ to a higher speed with the pressure difference between the upstream and downstream of the compressor 11b like the second embodiment. Consequently in the either mode, the speed difference between the idle speed $N_{IDLE}$ and the boost speed $N_{BOOST}$ (e.g. 60,000 rpm) of the supercharger 11 is decreased, thereby decreasing the peak inrush current from the battery 31 during a transition from the non-boost to boost modes.

Further, in the third embodiment, the bypass control valve 12 regulates the airflow to the engine only in the second non-boost mode, so that excessive air induction to the engine 200 may be avoided in the first non-boost mode during the lower load and lower speed condition, where smaller percentage of the total airflow is inducted through the bypass passage 21 with the bypass control valve 12.

It is needless to say that the invention is not limited to the illustrated embodiments and that various improvements and alternative designs are possible without departing from the substance of the invention as claimed in the attached claims.

The invention claimed is:

1. A method for controlling an electrically driven supercharger of an internal combustion engine, comprising:
   operating said supercharger at a first speed during a first engine operating condition wherein torque is demanded at a first level;
   operating said supercharger at a second speed during a second engine operating condition wherein torque is demanded at a second level that is lower than the first level, said second speed being lower than said first speed; and
   during the second engine operating condition, determining that a capacity of an electric power source to the supercharger decreases, and in response increasing the second speed at which the supercharger is operated.

2. The method as described in claim 1, further comprising supplying electricity from said electric power source to an electric motor to operate said supercharger during said first engine operating condition, said electricity being greater as the demanded engine torque increases.

3. The method as described in claim 2, further comprising supplying electricity from said electric power source to said electric motor to operate said supercharger at said second speed during said second engine operating condition, said electricity being greater as the capacity of said electric power source decreases.

4. The method as described in claim 2, further comprising generating a pressure drop across said supercharger during said second engine operating condition, said pressure drop being greater as the capacity of said electric power source decreases.

5. The method as described in claim 2, further comprising:
supplying electricity from said electric power source to said electric motor to operate said supercharger at said second speed during one part of said second engine operating condition, said electricity being greater as the capacity of said electric power source decreases; and
generating a pressure drop across said supercharger during an other part of said second engine operating condition at which time an intake airflow to said engine is smaller than the intake airflow during said one part of said second engine operating condition, said pressure drop being greater as the capacity of said electric power source decreases.

6. The method as described in claim 1, further comprising supplying electricity from said electric power source to an electric motor to operate said supercharger at said second speed during said second engine operating condition, said electricity being greater as the capacity of said electric power source decreases.

7. The method as described in claim 6, wherein said capacity of said electric power source is determined from a voltage of a battery which consists of part of said electric power supply.

8. The method as described in claim 6, wherein maximum electricity supplied to said electric motor during said second engine operating condition is limited substantially to a capacity of an electric generator which consists of part of said electric power supply.

9. The method as described in claim 1, further comprising generating a pressure drop across said supercharger during said second engine operating condition, said pressure drop being greater as the capacity of said electric power source decreases.

10. The method as described in claim 1, further comprising:
supplying electricity from said electric power source to an electric motor to operate said supercharger at said second speed during one part of said second engine operating condition, said electricity being greater as the capacity of said electric power source decreases; and
generating a pressure drop across said supercharger during an other part of said second engine operating condition at which time an intake airflow to said engine is smaller than the intake airflow during said one part of said second engine operating condition, said pressure drop being greater as the capacity of said electric power source decreases.

11. A method for controlling an electric motor to drive a compressor capable of boosting intake air to an internal combustion engine, comprising:
supplying electricity from an electric power source to said electric motor to operate said compressor at a first speed during a first engine operating condition, wherein torque is demanded at a first level; and
supplying electricity from said electric power source to said electric motor to operate said compressor at a second speed during a second engine operating condition at which time the demanded engine torque is at a second level, the second level smaller than the demanded engine torque at the first level during said first engine operating condition, said second speed being lower than said first speed; and
during the second engine operating condition, determining that a capacity of the electric power source to a supercharger decreases, and in response increasing the second speed at which the supercharger is operated.

12. An engine system having an electrically driven supercharger comprising:
an internal combustion engine;
a compressor capable of boosting intake air into said internal combustion engine;
an electric motor capable of driving said compressor;
an electric power source capable of supplying electricity to said electric motor to operate said electric motor; and
a controller configured to:
operate said compressor at a first speed during a first engine operating condition wherein torque is demanded at a first level;
operate said compressor at a second speed during a second engine operating condition wherein torque is demanded at a second level that is lower than the first level, said second speed being lower than said first speed; and
during the second engine operating condition, determine that a capacity of the electric power source to the supercharger decreases, and in response increase the second speed at which the supercharger is operated.

13. The system as described in claim 12, wherein said electric power source comprises an electric generator driven by said engine and capable of solely supplying electricity to said electric motor at least during said second engine operating condition.

14. The system as described in claim 12, wherein said electric power source comprises a battery capable of being charged by an electric generator and supplying electricity to said electric motor during said first engine operating condition.

15. The system as described in claim 14, wherein said electric power source further comprises said electric generator driven by said engine and capable of charging said battery.

16. The system as described in claim 12, further comprising:
a boost passage introducing air through said compressor into said engine;
a bypass passage introducing air into said engine bypassing said boost passage; and
a bypass control valve capable of regulating an airflow through said bypass passage;
wherein said controller is further configured to control said bypass control valve so that said bypass passage is closed during said first engine operating condition.

17. The system as described in claim 16, wherein said controller is further configured to control said bypass control valve so that said bypass passage is at least partly closed when said capacity of said electric power source decreases during said second engine operating condition.

18. The system as described in claim 16, wherein said controller is further configured to control said bypass control valve so that said bypass passage is at least partly closed when said capacity of said electric power source decreases and is fully opened otherwise during said second engine operating condition.

19. The system as described in claim 16, further comprising:
- a common intake passage arranged downstream both of said boost passage and said bypass passage; and
- a throttle valve capable of throttling airflow through said common intake passage;
- wherein said controller is further configured to control said bypass control valve and said throttle valve so that said common intake passage is substantially fully opened and said bypass passage is throttled in response to the demanded engine torque when said capacity of said electric power source decreases.

* * * * *